United States Patent Office 3,026,179
Patented Mar. 20, 1962

3,026,179
PREPARATION OF SELECTED INORGANIC FLUORIDES
William Channing Smith, Wilmington, Del., assignor to E. I. du Pont de Nemours and Company, Wilmington, Del., a corporation of Delaware
No Drawing. Filed June 7, 1957, Ser. No. 664,153
13 Claims. (Cl. 23—203)

This invention relates to a new process for preparing fluorine compounds. In particular, it refers to a new process for preparing inorganic fluorides of certain nonmetals.

The fluorides of phosphorus, arsenic, sulfur and selenium are compounds which are well known and which have been described frequently in the chemical literature. The fluorides of tellurium have also been described but in general are less well known than those of the other elements. The broad range of physical and chemical properties displayed by the fluorides of these elements permits their use in a variety of applications. For example, they can be used as catalysts for organic reactions, as fluorinating reagents, as agents for etching glass or, where chemical reactivity is low, as dielectric media.

The fluorides have generally been prepared heretofore by the reaction of gaseous fluorine with oxides of the elements or, in some cases, by the action of antimony fluoride on the oxychlorides of the elements. These processes are not uniformly applicable for preparing all of the fluorides. They are frequently difficult to control and, where gaseous fluorine is used as a reactant, require special precautions.

A general object of the present invention is, therefore, to provide a new process for preparing fluorides of the nonmetals phosphorus, arsenic, sulfur, selenium and tellurium.

A more specific object is provision of a process for preparing such fluorides which avoids the use of elementary fluorine.

Pursuant to the above-mentioned and yet further objects, it has now been found that inorganic fluorides and oxyfluorides can be prepared by contacting sulfur tetrafluoride with a compound containing oxygen and an element which is a nonmetal of atomic number 15 through 52 chosen from groups V–A and VI–A of the periodic table as set forth, for example, in Deming's "General Chemistry," 5th ed., Wiley, 1944, said element being bonded solely to oxygen, any other element in the compound being a metal.

The division of elements into metals and nonmetals is well recognized in modern chemistry. It is discussed, for example, in Deming's "General Chemistry" (John Wiley and Sons, Inc., 5th ed., chapter 11), and in Morgan and Burstall's "Inorganic Chemistry—A Survey of Modern Developments" (W. Heffer and Sons, Ltd., pp. 18–19). The metals, according to the periodic table in Deming's "General Chemistry," are the elements of groups I, II, VIII, III–B, IV–B, V–B, VI–B, VII–B and the elements in groups III–A, IV–A, V–A, and VI–A which have atomic numbers above 5, 14, 33 and 52, respectively.

In one embodiment of the invention, the binary oxides of phosphorus, arsenic, sulfur, selenium or also of tellurium are contacted with sulfur tetrafluoride. Examples of oxides which can be used are phosphorus trioxide, phosphorus pentoxide, arsenic trioxide, arsenic pentoxide, sulfur dioxide, sulfur trioxide, selenium dioxide, selenium trioxide, tellurium monoxide, tellurium dioxide and tellurium trioxide. In this embodiment of the invention, the preferred compounds are the oxides of phosphorus, arsenic, sulfur and selenium.

In a second embodiment of the invention, metal phosphates, arsenates, sulfates, selenates and tellurates are contacted with sulfur tetrafluoride. Examples of suitable compounds are sodium phosphate, potassium arsenate, potassium sulfate, titanium sulfate, zinc sulfate, stannic sulfate, bismuth sulfate, sodium selenate, nickel selenate, cadmium selenate, calcium tellurate and barium tellurate. Other compounds which can be used are potassium phosphite, sodium sulfite, calcium arsenite, potassium selenite and calcium tellurite. In this embodiment of the invention, the preferred compounds are the alkali metal and alkaline earth metal phosphates, arsenates, sulfates and selenates. These compounds are preferred because of availability and ease of reaction.

The oxides of the elements can be employed in pure form or in admixtures from which it is desired to obtain the phosphorus, arsenic, sulfur, selenium or tellurium in the form of a fluoride. Thus, there can be used mixtures of phosphorus trioxide and phosphorus pentoxide, arsenic trioxide and sulfur trioxide, sulfur dioxide and sulfur trioxide, sulfur trioxide and selenium dioxide, or sulfur trioxide and tellurium dioxide.

In the process of the invention as applied to the oxides of sulfur, only part of the oxygen is replaced with fluorine. With sulfur trioxide, for example, there will be obtained thionyl fluoride and sulfuryl fluoride. With the oxides of phosphorus, arsenic, selenium and tellurium, all or part of the oxygen can be replaced with fluorine. There can be obtained, for example, phosphorus pentafluoride, phosphorus oxyfluoride, arsenic oxyfluoride, selenium tetrafluoride, selenium oxyfluoride, and tellurium tetrafluoride. The products of the reaction can be and frequently are mixtures of fluorides and oxyfluorides which can be separated by conventional methods, for example, fractional distillation or sublimation.

Sulfur tetrafluoride, which is here used as the fluorinating agent, can be prepared by methods described in the literature (Brown and Robinson, J. Chem. Soc. 1955, 3147–51).

The reaction is conducted under substantially anhydrous conditions in either a batch or continuous flow process. In either process the reaction chamber is preferably made of material resistant to chemical attack by hydrogen fluoride, for example, stainless steel or platinum. In a batch process a vessel capable of withstanding pressure is, preferably, flushed with an inert gas, for example, nitrogen, to displace the air. When the oxygen-containing reactant is a gas or volatile liquid, the reaction chamber is cooled, evacuated to a pressure of several millimeters and then charged with the oxygen-containing compound and sulfur tetrafluoride. When the oxygen-containing reactant is a nonvolatile solid, it can be charged into the chamber prior to cooling and evacuating.

The ratio in which the reactants are used is not critical but for maximum yield of product the sulfur tetrafluoride is preferably used in excess. The molar ratio of sulfur tetrafluoride to inorganic oxide will be determined in part by the number of oxygen atoms present in the oxide. Generally at least one-half mole of sulfur tetrafluoride is used for each atom of oxygen to be replaced. The quantity of sulfur tetrafluoride can, however, range from as low as 0.1 mole to as high as 20 moles for each atom of oxygen present in the inorganic oxide.

The temperature of the reaction is kept as low as operability permits and preferably lies between about 20° C. and 500° C. The pressure employed is generally autogenous and can lie between about 5 atmospheres and 50 atmospheres. For a batch process, the reaction time is between about 2 hours and about 40 hours. During the reaction period, the contents of the reaction vessel are preferably mixed, for example, by mechanical stirring or shaking.

In a continuous flow process, the reaction is conducted in a tube of corrosion-resistant material. The inorganic oxide, if a solid or liquid, is placed in the tube and sulfur tetrafluoride gas passed over it at a temperature sufficient to effect reaction. If the inorganic oxide is a gas, it is passed into the tube simultaneously with sulfur tetrafluoride. The tube, prior to the reaction, is preferably heated to insure complete removal of moisture. Volatile products are collected in traps cooled with, for example, solid carbon dioxide-acetone solution or liquid nitrogen. The volatile products can be separated into pure components by fractional distillation or by sublimation.

The following nonlimiting examples illustrate the process of this invention:

Example 1

A. A tube of borosilicate glass ("Pyrex"), 1 foot long and approximately 1 inch in diameter, was charged with 22.3 g. (1.57 moles) of phosphorus pentoxide, following which sulfur tetrafluoride gas was passed through the tube at atmospheric temperature, about 25° C. The temperature rose rapidly to 146° C. A total of 25.0 g. (0.22 mole) of sulfur tetrafluoride was passed through the tube over a period of 76 minutes, the temperature being maintained at 136–152° C. by the heat generated in the reaction. The gaseous product, which was condensed in the traps, weighed 36.0 g. and was shown by mass spectrographic analysis to be principally phosphorus oxyfluoride, $POF_3$. Thionyl fluoride was obtained as a by-product.

B. A pressure vessel of 145 ml. capacity lined with stainless steel was charged with 14.2 g. of phosphorus pentoxide, flushed with nitrogen, cooled in a solid carbon dioxide-acetone solution and evacuated to approximately 1 mm. pressure. It was then charged with 15 g. of sulfur tetrafluoride. The mixture was heated at 100° C. for 2 hours, 150° C. for 2 hours, 200° C. for 2 hours, and 250° C. for 8 hours. There was obtained 5.1 g. of volatile product which was shown by mass spectrometric analysis to be principally phosphorus oxyfluoride with a small amount of phosphorus pentafluoride.

Example 2

A glass reactor, similar to that described in Example 1, part A, was charged with 39.6 g. (0.20 mole) of arsenic trioxide. Sulfur tetrafluoride was passed through at about 25° C. for a period of 27 minutes during which time the temperature of the oxide rose slowly to 74° C. The rate of flow of sulfur tetrafluoride was increased and the temperature of the oxide rose to a maximum of 105° C. It was maintained between 84° C. and 105° C. for the remainder of the run. A total of 47.5 g. (0.40 mole) of sulfur tetrafluoride was passed through the reactor in 172 minutes. Liquid arsenic trifluoride, weighing 9.5 g., was collected in the receiver at the end of the reactor. The trap, which was attached to the end of the reactor and cooled with solid carbon dioxide-acetone solution, contained both a liquid and a solid. The liquid was volatilized and shown to be principally thionyl fluoride. The solid slowly released a gaseous product at room temperature (approximately 25° C.), leaving a liquid residue which weighed 12.2 g. and which was shown by nuclear magnetic resonance studies to be arsenic trifluoride. The solid originally in the trap was the adduct of arsenic trifluoride and sulfur tetrafluoride.

Examples 1 and 2 illustrate the process of the invention as applied to oxides of elements of group V–A of atomic numbers 15 and 33, that is, phosphorus and arsenic.

Example 3

Using the equipment and procedure as described in the second part of Example 1, a mixture of 25 g. (0.40 mole) of sulfur dioxide and 57.0 g. (0.50 mole) of sulfur tetrafluoride was heated at 50° C. for 2 hours, 100° C. for 2 hours, and 150° C. for 4 hours. There was obtained 76.9 g. of volatile reaction products which were collected in a stainless steel cylinder which was cooled in liquid nitrogen. Mass spectrometric analysis of the product, in the liquid phase, showed that it was composed of approximately 81 mole percent of thionyl fluoride ($SOF_2$) and approximately 15 mole percent of unreacted sulfur tetrafluoride ($SF_4$). The yield of thionyl fluoride was, therefore, about 80%.

Example 4

Using the bomb and process as described in the second part of Example 1, a mixture of 24.0 g. (0.30 mole) of commercial sulfur trioxide and 64 g. (0.59 mole) of sulfur tetrafluoride was heated at 50° C. for 2 hours, 100° C. for 2 hours, and 150° C. for 4 hours. There was obtained 85.5 g. of a volatile product which was collected in a stainless steel cylinder cooled with liquid nitrogen and 3.6 g. of a colorless liquid. Mass spectrometric analysis of the volatile product showed that it was a mixture of sulfur fluorides of which the major components were pyrosulfuryl fluoride ($S_2O_5F_2$) and thionyl fluoride ($SOF_2$) with a small quantity of sulfuryl fluoride ($SO_2F_2$). Substantially all of the sulfur trioxide had reacted with high conversion to hexavalent fluorides of sulfur.

Example 5

Using the bomb and process as described in the second part of Example 1, a mixture of 22 g. (0.20 mole) of selenium dioxide and 88 g. (0.80 mole) of sulfur tetrafluoride was heated at 100° C. for 2 hours, 170° C. for 4 hours, and 240° C. for 8 hours. There was obtained 27.8 g. of liquid selenium tetrafluoride in essentially pure form. The yield was 89.5%.

*Analysis.*—Calcd. for $SeF_4$: Se, 50.96%; F, 49.1%. Found: Se, 51.90%; F, 48.89%.

Example 6

Using a bomb and process similar to that described in the second part of Example 1, a mixture of 101.5 g. (0.63 mole) of tellurium dioxide and 150 g. (1.39 moles) of sulfur tetrafluoride was heated at 150° C. for 12 hours. There was obtained 115.1 g. of crude tellurium tetrafluoride, as a gay colored crystalline solid. It was purified by sublimation.

Examples 3, 4, 5 and 6 illustrate the invention as it is applied to oxides of elements of group VI–A of atomic numbers 16 through 52, that is, sulfur, selenium or tellurium.

Example 7

Using the bomb and process as described in the second part of Example 1, a mixture of 13.6 g. (0.1 mole) of anhydrous calcium sulfate and 54 g. (0.5 mole) of sulfur tetrafluoride was heated at 350° C. for 8 hours. There was obtained 60 g. of volatile product which was shown by mass spectrographic analysis to consist of about 26 mole percent of sulfuryl fluoride ($SO_2F_2$) and about 43 mole percent of thionyl fluoride. The remaining volatile product was unreacted sulfur tetrafluoride. There was also obtained 6.89 g. of calcium fluoride as a by-product.

Example 8

A. Using the bomb and process as described in the second part of Example 1, a mixture of 14.2 g. (0.1 mole) of powdered anhydrous sodium sulfate and 54 g. (0.5 mole) of sulfur tetrafluoride was heated 10 hours at 350° C. There was obtained 50.5 g. of a volatile product which was shown by mass spectrographic analysis to consist of about 47 mole percent of thionyl fluoride with a small amount of sulfuryl fluoride. There was also obtained 1.5 g. of a pale green solid which was not identified.

B. In another experiment, the mixture described above (8A), was heated for 5 hours at 500° C., yielded 18.5 g. of volatile sulfur fluorides and 7.27 g. of a solid which contained crystalline sodium fluoride.

Examples 7 and 8 illustrate the invention applied to compounds containing phosphorus, arsenic, sulfur, selenium or tellurium bonded solely to oxygen and, in addition, one other element which is a metal.

The process of the invention can also be applied to naturally occurring minerals and ores which contain phosphorus, arsenic, sulfur, selenium and tellurium bonded solely to oxygen.

Since obvious modifications in my invention will be apparent to those skilled in the chemical arts, I propose to be bound solely by the appended claims.

The embodiments of the invention in which an exclusive property or privilege is claimed are defined as follows:

1. The process of preparing at least one member of the group consisting of the fluorides and oxyfluorides of phosphorus, arsenic, sulfur, selenium and tellurium which comprises reacting, under substantially anhydrous conditions, sulfur tetrafluoride with at least one member of the group consisting of (1) the oxides of phosphorus, arsenic, sulfur, selenium and tellurium and (2) metal phosphates, arsenates, sulfates, selenates, tellurates, phosphites, arsenites, sulfites, selenites and tellurites.

2. The process of preparing at least one member of the group consisting of the fluorides and oxyfluorides of phosphorus which comprises reacting, under substantially anhydrous conditions, sulfur tetrafluoride with a binary oxide of phosphorus.

3. The process of claim 2 wherein the binary oxide is phosphorus pentoxide.

4. The process of preparing at least one member of the group consisting of the fluorides and oxyfluorides of arsenic which comprises reacting, under substantially anhydrous conditions, sulfur tetrafluoride with a binary oxide of arsenic.

5. The process of claim 4 wherein the binary oxide is arsenic trioxide.

6. The process of preparing at least one oxyfluoride of sulfur which comprises reacting, under substantially anhydrous conditions, sulfur tetrafluoride with a binary oxide of sulfur.

7. The process of claim 6 wherein the binary oxide is sulfur dioxide.

8. The process of claim 6 wherein the binary oxide is sulfur trioxide.

9. The process of preparing at least one oxyfluoride of sulfur which comprises reacting, under substantially anhydrous conditions, sulfur tetrafluoride with a metallic sulfate.

10. The process of claim 9 wherein the metallic sulfate is calcium sulfate.

11. The process of claim 9 wherein the metallic sulfate is sodium sulfate.

12. The process of preparing at least one member of the group consisting of the fluorides and oxyfluorides of selenium which comprises reacting, under substantially anhydrous conditions, sulfur tetrafluoride with selenium dioxide.

13. The process of preparing at least one member of the group consisting of the fluorides and oxyfluorides of tellurium which comprises reacting, under substantially anhydrous conditions, sulfur tetrafluoride with tellurium dioxide.

References Cited in the file of this patent

Michaelis: "Gazz. Chim. et al.," 3, 53 (1873), summary in Jacobson "Enc. of Chem. Rea.," vol. III Rea. VII–160.

Reaction of Tellurium Dioxide and Selenium Tetrafluoride; Preparation of Tellurium Tetrafluoride, R. Campbell et al., Chemical Society Journal, London, The Chemical Society, 1956, page 785.

New Co-ordination Compounds formed by the Tetrafluorides of the Sulphur Sub-Group, N. Bartlett et al., Chemistry and Industry, publ. of the Society of Chemical Industry, London, November 1956, page 1351.